(12) United States Patent
Nola et al.

(10) Patent No.: US 7,746,984 B2
(45) Date of Patent: Jun. 29, 2010

(54) METHOD AND SYSTEM FOR CALL INITIATION IN A VIDEO RELAY SERVICE

(75) Inventors: Pat Nola, Salt Lake City, UT (US); Jon Hodson, South Jordan, UT (US); Michael Drew Flathers, Alpine, UT (US); Glenn Daniel Clapp, Sandy, UT (US); Edward Franz Armstrong, American Fork, UT (US); Theresa R. Armstrong, legal representative, American Fork, UT (US); Scot Lorin Brooksby, Highland, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 1159 days.

(21) Appl. No.: 11/225,954

(22) Filed: Sep. 14, 2005

(65) Prior Publication Data

US 2007/0064888 A1  Mar. 22, 2007

(51) Int. Cl.
*H04M 11/03* (2006.01)
*H04N 7/14* (2006.01)
(52) U.S. Cl. .................... 379/52; 379/93.15; 379/90.01
(58) Field of Classification Search .................. 379/52, 379/93.15, 90.01, 355.03; 348/14.01–14.16
See application file for complete search history.

(56) References Cited

U.S. PATENT DOCUMENTS

| 4,878,843 | A | | 11/1989 | Kuch |
|---|---|---|---|---|
| 5,559,855 | A | | 9/1996 | Dowens et al. |
| 5,890,120 | A | | 3/1999 | Haskell et al. |
| 5,936,679 | A | * | 8/1999 | Kasahara et al. ............ 348/553 |
| 5,982,853 | A | | 11/1999 | Liebermann |
| 5,990,878 | A | | 11/1999 | Ikeda et al. |
| D421,225 | S | | 2/2000 | Kelley |
| 6,116,907 | A | | 9/2000 | Baker et al. |
| 6,204,974 | B1 | | 3/2001 | Spitzer |
| 6,317,716 | B1 | | 11/2001 | Braida et al. |

(Continued)

FOREIGN PATENT DOCUMENTS

EP  1 764 990 A2  3/2007

(Continued)

OTHER PUBLICATIONS

European Search Report, EP 06 07 6734, dated Dec. 11, 2006, 7 pages.

(Continued)

*Primary Examiner*—Melur Ramakrishnaiah
(74) *Attorney, Agent, or Firm*—TraskBritt (57) ABSTRACT

A method and system for call initiation and the establishment of a communication session in a video relay service are described. A called party number of a voice phone is entered into a video phone and a first segment of a communication session is established between the video phone and a Video Relay Service (VRS) system according to a network address of the VRS system stored within the video phone. The called party number is forwarded to the VRS system over the first segment of the communication session. A second segment of the communication session is established between the VRS system and the voice phone without any additional interaction by a user of the video phone using the called party number of the voice phone.

19 Claims, 7 Drawing Sheets

U.S. PATENT DOCUMENTS

| | | |
|---|---|---|
| 6,349,001 B1 | 2/2002 | Spitzer |
| 6,353,503 B1 | 3/2002 | Spitzer et al. |
| 6,356,392 B1 | 3/2002 | Spitzer |
| 6,384,982 B1 | 5/2002 | Spitzer |
| 6,498,628 B2 | 12/2002 | Iwamura |
| 6,553,116 B1 * | 4/2003 | Vander Meiden ...... 379/355.08 |
| 6,611,281 B2 | 8/2003 | Strubbe |
| 6,618,099 B1 | 9/2003 | Spitzer |
| 6,693,630 B1 | 2/2004 | Siskind |
| 6,724,354 B1 | 4/2004 | Spitzer et al. |
| 6,775,014 B2 | 8/2004 | Foote et al. |
| 7,016,479 B2 * | 3/2006 | Flathers et al. ................ 379/52 |
| 2002/0177112 A1 | 11/2002 | Heller |
| 2005/0073574 A1 * | 4/2005 | Krisbergh et al. ........ 348/14.01 |
| 2005/0091311 A1 | 4/2005 | Lund et al. |
| 2005/0094777 A1 | 5/2005 | McClelland |
| 2006/0285652 A1 | 12/2006 | McClelland et al. |

FOREIGN PATENT DOCUMENTS

| | | |
|---|---|---|
| EP | 1 764 991 A1 | 3/2007 |
| EP | 1 770 481 A2 | 4/2007 |
| JP | 2004-343175 | 12/2004 |
| WO | WO 2005/039165 A2 | 4/2005 |

OTHER PUBLICATIONS

Effective set-up for performing phone conversations by the hearing impaired, IBM Technical Disclosure Bulletin IBM Corp. New York, US, Dec. 1, 1991, pp. 423-426, vol. 34, No. 7B.

European Search Report for EP 06 07 6735 dated Mar. 14, 2007.

European Search Report for EP 06 07 6736 dated Jan. 4, 2007.

* cited by examiner

METHOD AND SYSTEM FOR CALL INITIATION IN A VIDEO RELAY SERVICE

BACKGROUND OF THE INVENTION

1. Field of the Invention

The invention relates generally to call initiation in a communication system, and, more particularly, to a method and system for efficiently initiating calls in a Video Relay Service (VRS).

2. State of the Art

Connection-based or point-to-point calls, such as conventional telephone calls, for example, over a public switched telephone network, are generally established in a real time or near real time manner. As such, the establishment of communication sessions generally does not require the formation of a queue or waiting list for the establishment of connection-based calls. Additionally, the establishment of a communication session in conventional point-to-point telephone call generally consists of direct dialing of the called party by the calling party.

However, when a communication session requires, for example, an intermediary service, such as interpretive services for the deaf or hearing-impaired, the formation of a queue or waiting list is commonplace as call-initiating parties await the availability of interpretive services. The formation of a communication session between a calling party and a called party may involve multiple dialing strings or multiple numbers to be dialed for establishing the various segments of the communication session.

A channel formed between a calling party and an interpretive service provider may frequently be established over a connectionless network. Such alternative network configurations between a called party and an interpretive service may be required due to the enhanced bandwidth nature of such a connection, particularly if such a connection employs a broadband device, such as a video phone for communicating between the called party and the interpretive service. As such, a broadband network for facilitating the transfer of an enhanced bandwidth data may employ connectionless channels such as one employing Internet Protocol (IP) or other packetized connectionless technologies. It is appreciated by those of ordinary skill in the art that establishment of such communication sessions that involve an intermediary service, such as translation services, typically requires a more complex and unintuitive call connection methodology.

Therefore, in order to provide an enhanced experience for a user in a communication system where a calling party needs the assistance of an intermediary service, a need exists for streamlining the establishment of the various segments of the communication session.

BRIEF SUMMARY OF THE INVENTION

The present invention is directed to a method and system for call initiation in a video relay service. In one embodiment of the present invention, a method for establishing a communication session is provided. The method includes entering in a video phone a called party number of a voice phone. A first segment of the communication session is established between the video phone and a Video Relay Service (VRS) system according to a network address of the VRS system stored within the video phone. The called party number is forwarded to the VRS system over the first segment of the communication session. A second segment of the communication session is established between the VRS system and the voice phone using the called party number of the voice phone.

In another embodiment of the present invention, a video phone including an interface configured to receive a called party number and to initiate a communication session is provided. The video phone further includes a storage configured to store the called party number and to have stored therein a network address of a Video Relay Service (VRS) system. A control process is also provided in the video phone with the control process being configured to operably interact with the interface and the storage. The control process is further configured to establish a first segment of the communication session between the video phone and the VRS system using the network address of the VRS system stored within the storage and to forward the called party number to the VRS system over the first segment of the communication session.

In yet another embodiment of the present invention, a video relay service (VRS) is provided. The video relay service (VRS) includes control logic configured to cooperatively establish a first segment of a communication session with a video phone and to receive unsolicited from the video phone over the first segment of a communication session a called party number. The control logic is further configured to cooperatively establish a second segment of the communication session with a voice phone as designated by the called party number. The video relay service (VRS) further includes storage configured to store the called party number as received over the first segment of the communication session until the control process establishes the second segment of the communication session.

In a further embodiment of the present invention, a video relay service (VRS) system is provided. The video relay service (VRS) system includes a video phone and a video relay service (VRS). The video phone includes an interface configured to receive a called party number and to initiate a communication session and storage configured to store the called party number and to have stored therein a network address of a Video Relay Service (VRS) system. The video phone further includes a control process configured to operably interact with the interface and the storage and to establish a first segment of the communication session between the video phone and the VRS system using the network address of the VRS system stored within the storage. The control process further forwards the called party number to the VRS system over the first segment of the communication session. The video relay service (VRS) includes control logic configured to cooperatively establish a first segment of a communication session with a video phone and to receive unsolicited from the video phone over the first segment of a communication session a called party number. The video relay service (VRS) control logic is further configured to cooperatively establish a second segment of the communication session with a voice phone as designated by the called party number. Additionally, the video relay service (VRS) also includes storage configured to store the called party number as received over the first segment of the communication session until the control process establishes the second segment of the communication session.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
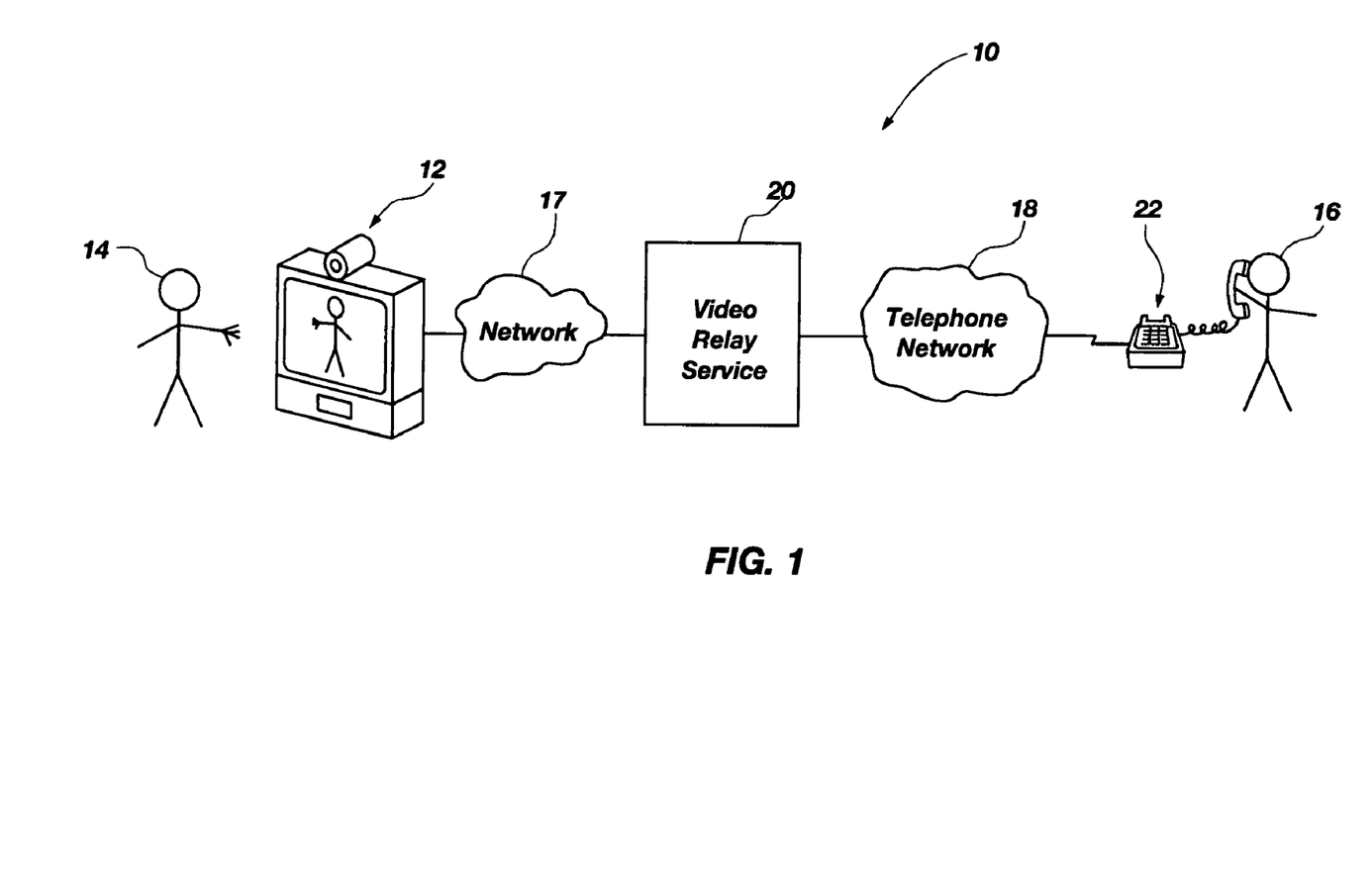
FIG. 1 illustrates a hearing-impaired communication system, in accordance with an embodiment of the present invention.

FIG. 1 illustrates a hearing-impaired communication system configured to facilitate a communication session between a hearing-impaired user and a hearing-capable user, in accordance with an embodiment of the present invention. A hearing-impaired communication system 10 enables a hearing-impaired user 14 to engage in conversation through a communication system with a hearing-capable user 16. A communication session between the users is facilitated through the use of various equipments, which are preferably coupled together using various networks, including a telephone network, such as the Public Switch Telephone Network (PSTN).

To interface a hearing-impaired user into a generally voice-based communication system, interpretive services are employed allowing hearing-impaired users to communicate with an interpreter, namely through sign language. The sign language images are then translated by a video relay service 20 and when translated into voice information, are then forwarded over a voice-based communication connection to the hearing-capable user 16. One means for relaying the communicative expressions of a hearing-impaired user 14 within hearing-impaired communication system 10 incorporates a video phone 12 for capturing and displaying the communicative expressions exhibited by hearing-impaired user 14 and for displaying interpreted voice information originating from the hearing-capable user 16. The expressions, such as sign language and/or body language, may be interpreted or translated by video relay service 20. Hearing-capable user 16 interacts in a conventional manner with video relay service 20 through the use of a voice-based dialogue conveyed over a conventional voice phone 22. The various devices, such as video phone 12 and conventional voice phone 22, are coupled to video relay service 20 using one or more networks 17, 18. To facilitate the enhanced bandwidth needs of video phone 12, network 17 may be implemented as a high bandwidth network such as a DSL, Cable, Ethernet or other enhanced-bandwidth networking technology. Network 18 may be implemented according to the standards and bandwidth requirements of conventional voice phone 22.

Figure 2:
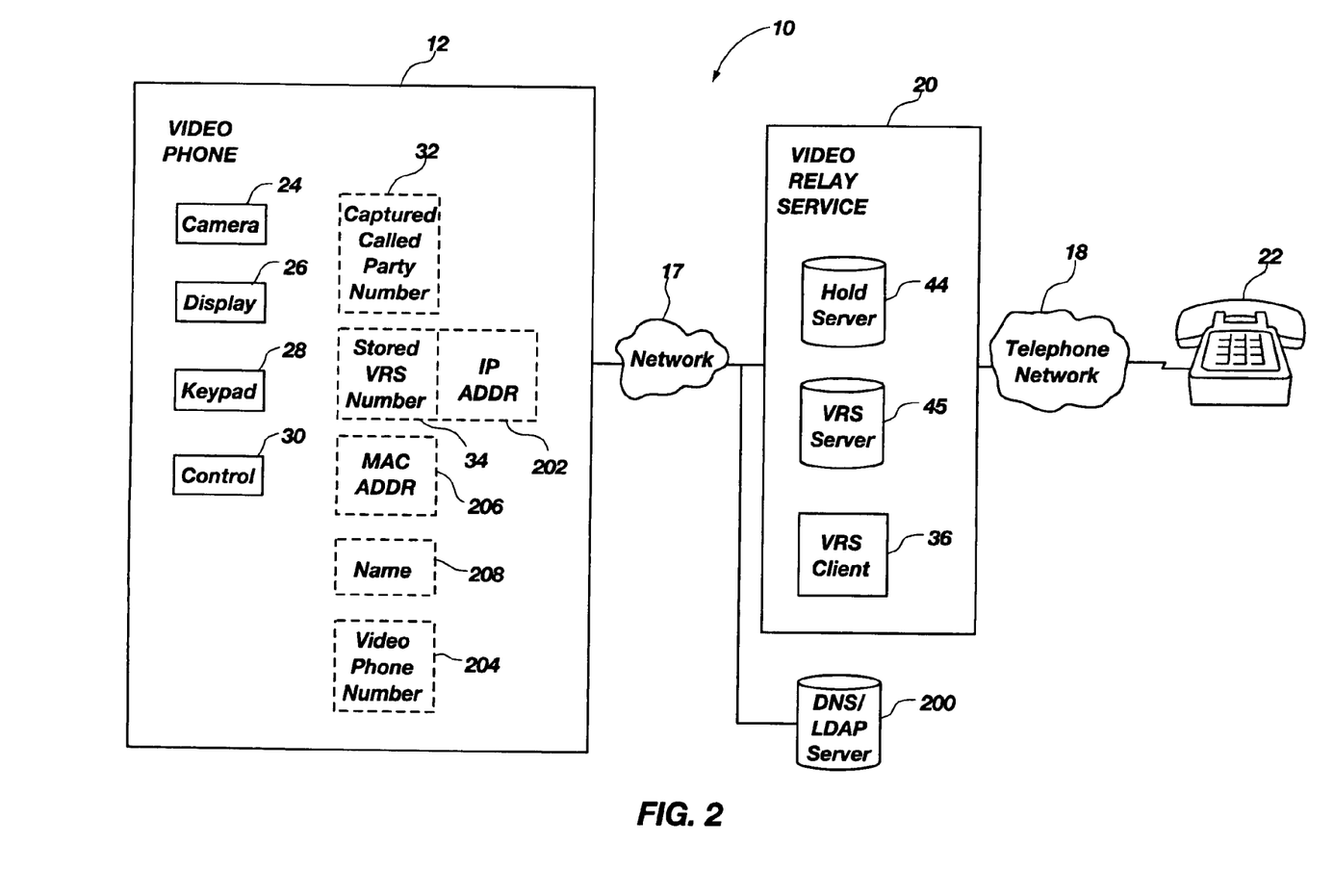
FIG. 2 illustrates a simplified block diagram of a hearing-impaired communication system, in accordance with an embodiment of the present invention.

FIG. 2 is a simplified diagram of a hearing-impaired communication system 10, in accordance with an embodiment of the present invention. To facilitate an interaction with a hearing-impaired user, a video phone 12 includes video components such as a camera 24, for capturing the communicative expression of the hearing-impaired user and further includes a display or monitor 26 for displaying the communicative expressions originating from the hearing-capable user as interpreted by video relay service 20.

Video phone 12, in accordance with an embodiment of the present invention, further includes a keypad 28 or other data entry device configured to enable the hearing-impaired user to initiate a communication session in a conventional manner by entering the telephone number of the hearing-capable user, also known herein as a called party telephone number, which is captured and stored as captured called party number 32. In accordance with one embodiment of the present invention, the hearing-impaired user is able to interact with video phone 12 to initiate a phone call in a manner consistent with the interaction of a hearing-capable user initiating a phone call using a conventional telephone. Specifically, a hearing-impaired user enters, using an input device such as keypad 28, the called party number that is captured by a control process 30 and stored as a captured called party number 32.

Control process 30 retrieves a stored VRS number 34, which identifies a specific video relay service, and using a protocol, such as DNS or LDAP protocol, contacts a DNS or an LDAP server 200 and passes thereto a domain name or stored VRS number 34 and requests therefrom a corresponding IP address 202, which is returned to video phone 12. Video phone 12 thereafter initiates a call to video relay service 20 over network 17 using, for example, corresponding IP address 202 as returned from LDAP server 200. Control process 30 initiates a communication session over network 17 between video phone 12 and video relay service 20. In one embodiment of the present invention, the communication session between video phone 12 and video relay service 20 is more specifically initially connected to a hold server 44 within video relay service 20. Hold server 44 communicates with a VRS server 45 and when hold server 44 receives an inbound call in the form of a call request for the establishment of a communication session between video phone 12 and video relay service 20, hold server 44 notifies VRS server 45 of the intention to establish a communication session between video phone 12 and conventional voice phone 22. During the establishment of the communication session between video phone 12 and video relay service 20, video phone 12 passes a call request including calling information to hold server 44. The call request is subsequently passed to VRS server 45 including the calling information, which includes a video phone number 204, a MAC address 206, a name 208 and captured called party number 32. VRS server 45 includes and maintains a queue for one or more calls originating from video phones 12 seeking to establish or maintaining a communication session utilizing interpretive services as provided within VRS client 36.

Figure 3:
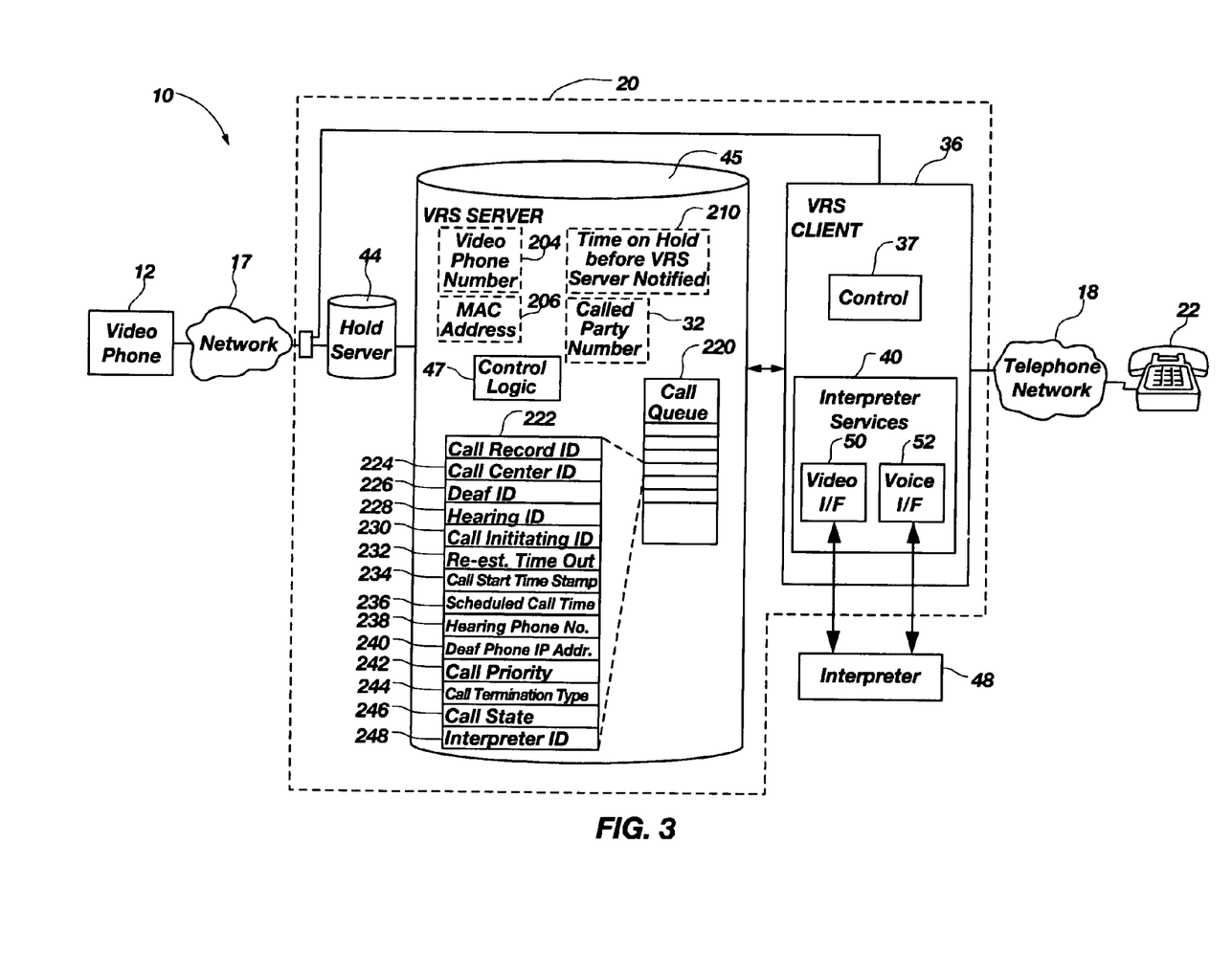
FIG. 3 is a functional block diagram of a video relay service configured for operation with a hearing-impaired communication system.

FIG. 3 is a functional block diagram of a hearing-impaired communication system 10 including a video relay system, configured in accordance with an embodiment of the present invention. The video phone 12 and voice phone 22 interact via video relay services 20 and as further coupled via network 17, 18. Video relay services 20, in addition to providing interconnection and interpretive services between a hearing-impaired user and a hearing-capable user, further provides reestablishment of a dropped or otherwise interrupted session, in accordance with an embodiment of the present invention. During the establishment of a connection between the video phone 12 and video relay services 20, call information including video phone number 204, MAC address 206, and captured called party number 32 are forwarded according to control logic 47 via hold server 44 to VRS server 45.

Additionally, when a connection with video phone 12 is received at hold server 44, hold server 44 begins timing the duration of the call on hold at hold server 44 prior to passing the call request and forwards to VRS server 45 a duration time on hold 210 before VRS server 45 is notified for use in prioritizing calls within call queue 220. When a call is received at VRS server 45, the call queue 220 is reprioritized or resorted, in accordance with the received call information.

Each call within call queue 220 is assigned a call record ID 222 that contains information regarding the specifics of the call for use in prioritizing or reattaching a call to a queue position and reestablishing a dropped or otherwise unintentionally terminated communication session. Call record ID 222 includes a call center ID 224, which may specify a specific one of a plurality of call centers providing interpretive services for servicing video relay service 20. Such identification enables the reestablishment of an unintentionally interrupted communication session.

Call record ID 222 further includes a deaf ID 226 and hearing ID 228 that provide an identification of the respective deaf and hearing users. Call record ID 222 further includes a call initiating ID 230 identifying which of the parties, the hearing-impaired or the hearing-capable party, initiated the call. Additionally, a reestablished time-out 232 identifies a settable time-out period within which an unintentionally terminated call may be reestablished without discarding such a call as an abandoned call. A call start time stamp 234 identifies the beginning time of an established session while a scheduled call time 236 identifies the requested start time for a previously scheduled call within video relay service 20. Call record ID 222 further includes a hearing phone number 238 and a deaf phone IP address 240 identifying the respective originating and destination devices.

A call priority 242 identifies emergency or otherwise higher priority devices. Call record ID 222 further includes a call termination type 244 identifying the termination status of a call, which may specify a requested normal type termination, or may be used for other testing or no answer type terminations. Call termination type 244 may be input and changed by an interpreter performing the interpretive services thereby identifying when a call terminates correctly or when an interruption occurs. A call state 246 identifies an ongoing status of a particular call including awaiting interpretive services state, call in process state and call terminated state. Call record ID 222 further includes an interpreter ID 248 utilized to store an identifier designating a specific interpreter performing interpretive services between the hearing-impaired user and the hearing-capable user. While call record ID as described herein includes various data elements, a subset or further augmentation of call record ID 222 is contemplated within the scope of the present invention.

Video relay service 20 further includes a VRS client 36, which provides interfaces to both the hearing-capable user at a voice phone 22 via network 18, and an interface with an interpreter 48 through interpreter services 40, which further includes video and voice interfaces 50, 52. The VRS client 36 notifies the VRS server 45 via control 37 when interpretive services are available. VRS server 45 thereafter services the next call request in the call queue 220. VRS client 36 then receives the call from the hold server 44 when the VRS server 45 determines which call request in the call queue 220 has priority and then instructs the hold server 44 to transfer the call to the VRS client 36.

Figure 4:
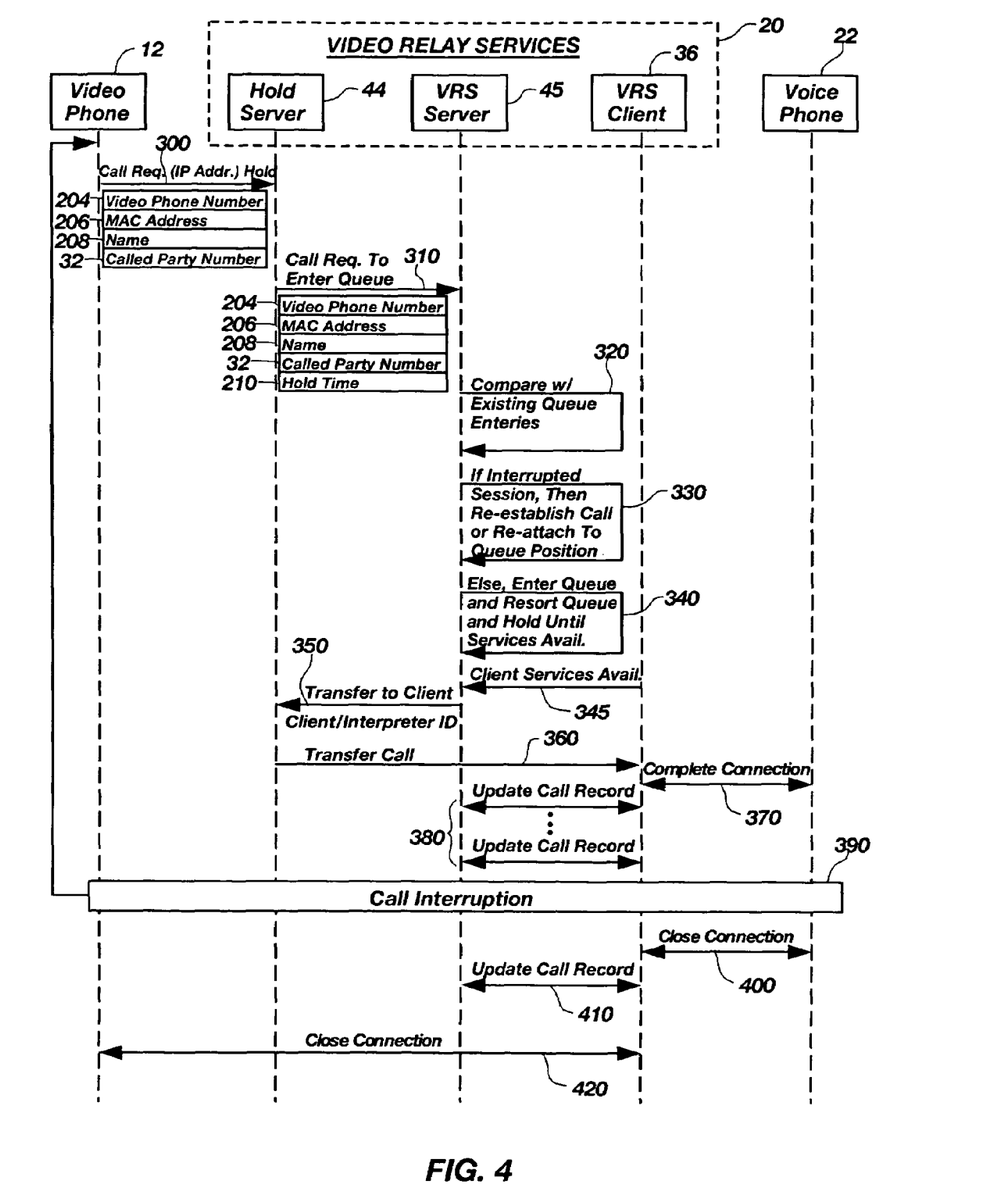
FIG. 4 is a flow diagram of call restoration within a video relay service, in accordance with an embodiment of the present invention.

FIG. 4 is a flow diagram illustrating the establishment of a communication session and recovery following a call interruption 390, in accordance with an embodiment of the present invention. In the present embodiment, a video phone 12 initiates a call 300 to video relay services 20 and passes thereto various call information, including video phone number 204, MAC address 206, a name 208 and captured called party number 32. A hold server 44 of video relay services 20 receives the initiated call 300 and places the call 300 on hold and issues a service's request to enter request 310 the call into a queue within VRS server 45. Information passed during enter request 310 includes video phone number 204, MAC address 206, a name 208, called captured called party number 32 as well as a duration time on hold 210 for delay encountered by the call while waiting on hold server 44.

VRS server 45 compares 320 the received information with any other entries within the call queue 220 (FIG. 3). If an entry within the call queue 220 corresponds to the received call information, an interrupted session or scheduled call is detected and, depending upon the call state, the call is either reestablished 330 if the communication session between the users was in progress or in the event that a connection was terminated while the user remained in the call queue 220, then the user re-attaches 330 to the queue position previously held.

If a match corresponding to the received call information is not detected within the call queue 220, then the new call request causes a call record ID 222 (FIG. 3) to be opened and populated according to the received call information. The call is then entered 340 into the queue and the queue is resorted based upon all entries within the queue. The call remains on hold at the hold server 44 with the VRS server 45 maintaining the call queue 220 and updating the hold times and other respective information within call record ID 222 (FIG. 3).

When interpretive resources become available 345, VRS server 45 issues a transfer request 350 designating a specific VRS client ID to which the hold server 44 should route the call corresponding to the call record ID on the top of call queue 220 (FIG. 3). Hold server 44 transfers 360 the call to VRS client 36 and VRS client 36 correspondingly completes 370 the connection with voice phone 22. During the established session, the call records are updated 380 to maintain information within call record ID 222 (FIG. 3) useful in the event of a call interruption 390.

If a call session is in progress and is subjected to a call interruption 390, processing reverts back to call initiation followed by subsequent detection of an interrupted session and the reestablishment of the call. When call interruption 390 is not present, VRS client 36 closes connection 400 with voice phone 22 and updates 410 the call record ID 222 (FIG. 3) to specify a proper termination or a termination type within the call record and then the connection is closed 420 with video phone 12.

Figure 5:
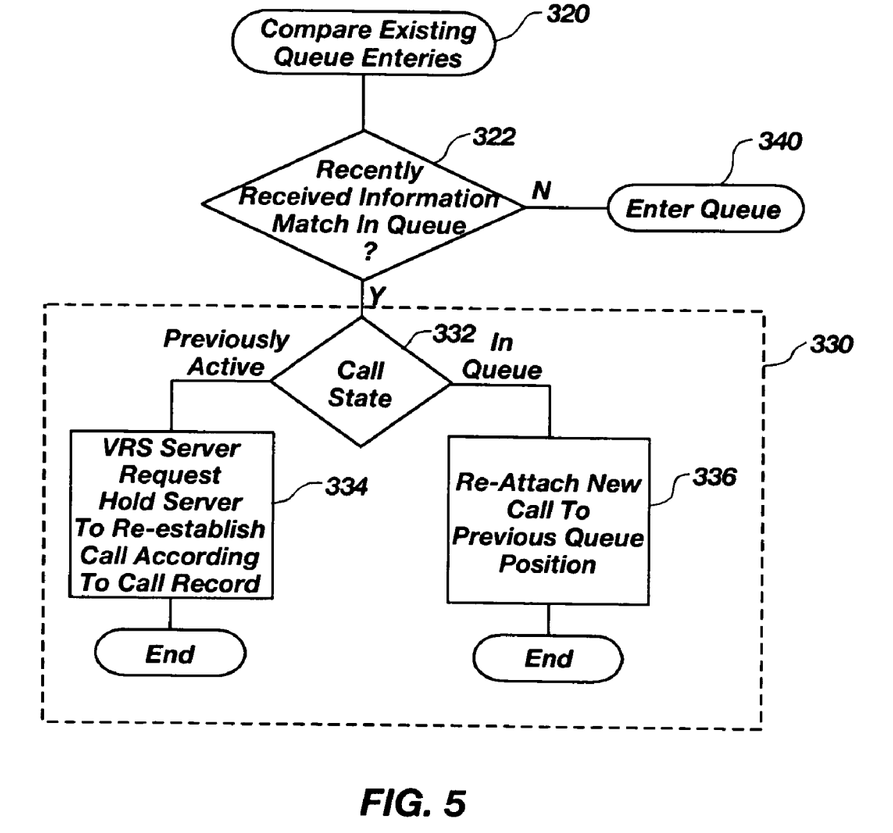
FIG. 5 is a flow diagram of processing a call request, in accordance with an embodiment of the present invention.

FIG. 5 is a flow diagram of comparison procedures for determining whether a received call was either in queue at the call queue or in progress during a session, in accordance with an embodiment of the present invention. When a call 300 is received and placed on hold (FIG. 4) at hold server 44 (FIG. 4), hold server 44 issues a call request 310 (FIG. 4) for the newly received call to enter the queue of VRS server 45 (FIG. 4). Once the call request is received at VRS server 45, the received information is compared 320 against each existing queue entry. In a matching or comparison process 322, when a match corresponding to the received information is not detected, the call is entered 340 into a call queue 220 (FIG. 3) with the entries within the call queue 220 being resorted according to criteria such as call priority (e.g., emergency calls) and cumulative hold times for each respective call.

When a match is detected, the call state is determined 332 in an attempt to evaluate whether the call was on hold within the call queue or whether the call was previously active prior to the call interruption. When the call state is determined 332 within the corresponding call record ID 222 (FIG. 3) lists the call as being previously in the queue position, then the new call is re-attached 336 to the previously held queue position.

When it is determined 332 from the call state that the call was in progress or in session, the VRS server 45 (FIG. 4) requests 334 that the hold server reestablish the call with the retrieved VRS client as stored within the corresponding call record.

Figure 6:
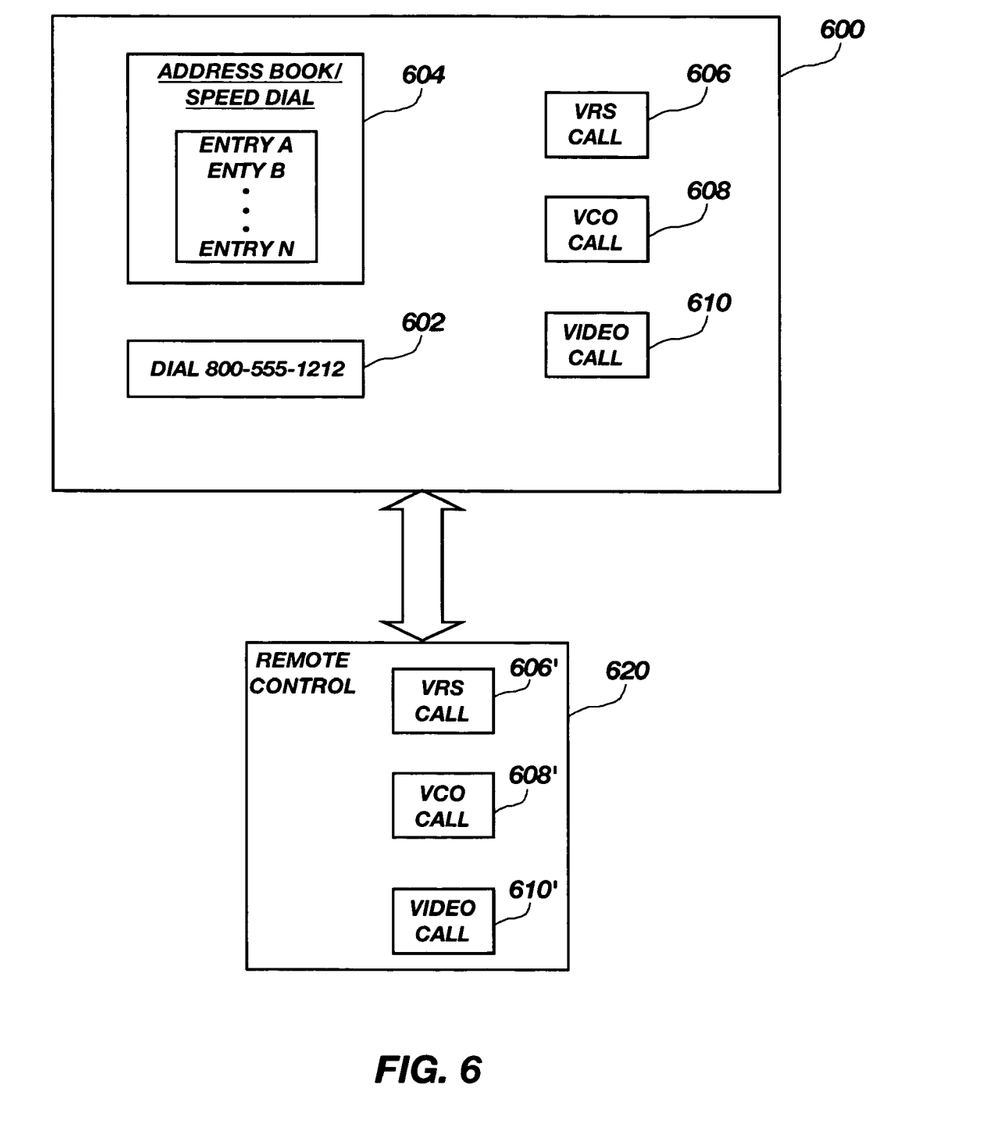
FIG. 6 illustrates an interface for initiating a call between a hearing-impaired user and a hearing-capable user, according to a single initiating step, in accordance with an embodiment of the present invention.
Figure 7:
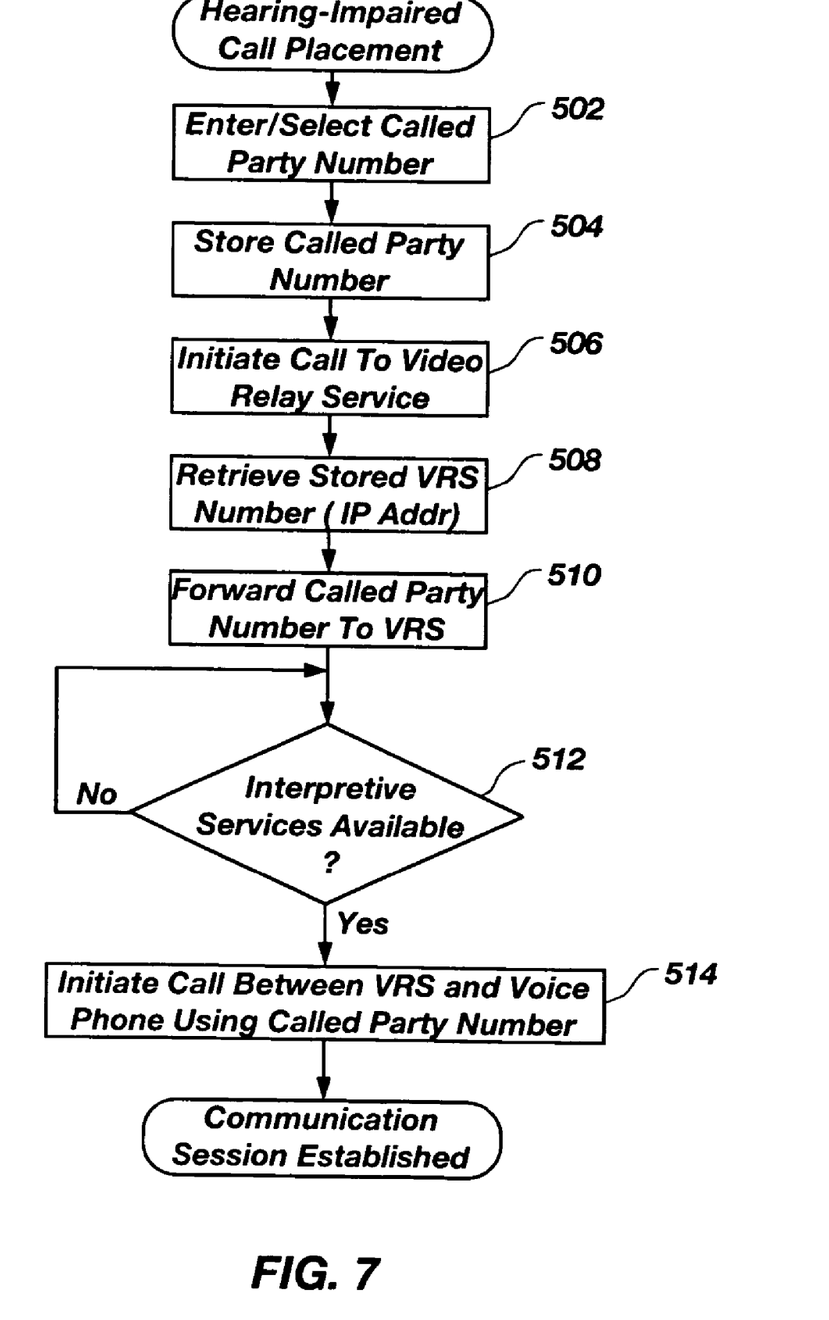
FIG. 7 is a flow diagram of call placement within a video relay service, in accordance with an embodiment of the present invention.

FIGS. 6 and 7 illustrate a view of a menu structure of a video phone for initiating a communication session via an intermediary service and a flowchart for placing a call according to the hearing-impaired communication system, in accordance with an embodiment of the present invention. As stated, the communication system facilitates the establishment of a communication session between a hearing-impaired user and a hearing-capable user via an interpretive service such as a video relay service using a single activation by the hearing-impaired user.

In accordance with one embodiment of the present invention, the hearing-impaired user is able to interact with video phone 12 (FIG. 2) to initiate a phone call in a manner consistent with the interaction of a hearing-capable user initiating a phone call using a conventional telephone. In FIG. 6, an interface illustrated as a menu 600 under the control of a control process 30 (FIG. 2) facilitates the acquisition of a called party number 602 through either individual numeral entries by the user or through the selection 502 (FIG. 7) of a stored number from an address book or speed dial list 604. Once the hearing-impaired user enters/selects/identifies 502 the called party number 602, the called party number 602 is captured and stored 504 (FIG. 7) for subsequent use in establishing a communication segment of a session with the hearing-capable user.

Once the called party number 602 is selected and stored, the communication session is established by a single activation 506 (FIG. 7) by the hearing-impaired user. The single activation 506 may be in the form of requesting specific intermediary services provide by the Video Relay Service and is requested through selecting one of a VRS call selector 606, a Voice Carry Over (VCO) call selector 608 or a conventional video call selector 610. It should be noted that the called party number may be of a hearing-capable user requiring the use of interpretive services for interaction with a hearing-impaired user. Exemplary interpretive services by the VRS may include full interpretive services or a more limited VCO capability.

Once the selection and single activation 506 is made, establishment of the communication session commences by establishing a first segment of the communication session by retrieving 508 (FIG. 7) a called party telephone number which is captured and stored as captured called party number 32 (FIG. 2). Specifically, the control process 30 (FIG. 2) retrieves a stored VRS number 34 (FIG. 2) which identifies a specific video relay service, either directly or through a DNS or LDAP-like service. The video phone forwards 510 (FIG. 7) the called party number to the VRS over the first segment of the communication session allowing the VRS to subsequently build the second segment of the communication session between the VRS and the hearing-capable user as identified by the called party number.

Since the VRS may be handling numerous calls requiring services, interpretive services may not be immediately available. When a decision 512 (FIG. 7) results in the determination that interpretive services are available, the VRS initiates 514 (FIG. 7) a call according to the called party number 32 (FIG. 3) between the VRS and the voice phone of the hearing-capable user. As illustrated, the present embodiment of the present invention allows the establishment of a communication session via a VRS between a hearing-impaired user using a video phone and a hearing-capable user using a voice phone according to an automated single step dialing methodology similar in complexity to the dialing methodology of conventional voice phones.

While the previously described menu 600 may use a pointing device (e.g., computer mouse, etc.) for entering and selecting commands therein, FIG. 6 further illustrates another embodiment of the present invention wherein a remote control device 620 may provide a mechanism for independently making numeral and functional selections of menu 600. The remote control device 620 may include numeral/keypad selectors or buttons and call selectors or buttons, such as VRS call selector 606', VCO call selector 608' and conventional video call selector 610', for aiding in the establishment of a communication session as described herein.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A method for establishing a communication session, comprising:
   entering in a video phone a called party number of a voice phone;
   selecting one of a Video Relay Service (VRS) call selector, a Voice Carry Over (VCO) call selector, and a video call selector after entering the called party number of the voice phone in the video phone;
   establishing a first segment of the communication session between the video phone and a Video Relay Service (VRS) system using a network address of the VRS system stored within the video phone;
   forwarding the called party number to the VRS system over the first segment of the communication session;
   entering a service request into a queue within the Video Relay Service (VRS) system; and
   establishing a second segment of the communication session between the VRS system and the voice phone using the called party number of the voice phone.

2. The method of claim 1, further comprising delaying the establishing the second segment until interpretive services of the VRS system are available.

3. The method of claim 1, wherein a menu of the video phone is configured for entering the called party number and selecting one service request.

4. The method of claim 1, wherein a remote control of the video phone is configured for entering of the called party number and selecting one service request.

5. The method of claim 1, wherein the establishing a first segment of a communication session and the establishing a second segment of the communication session occur from a single selection at the video phone.

6. The method of claim 1, further comprising storing the called party number of the voice phone until the first segment of the communication session is established.

7. A video phone, comprising:
   an interface configured to receive a called party number and to initiate a communication session;
   storage configured to store the called party number and to have stored therein a network address of a Video Relay Service (VRS) system; and
   control process configured to operably interact with the interface and the storage, the control process further configured to establish a first segment of the communication session between the video phone and the VRS system using the network address of the VRS system stored within the storage and forward the called party number, and a phone number, an address, and a name associated with the video phone to the VRS system over the first segment of the communication session;

wherein the control process is further configured to, upon selection of an associated selector, request one of a Video Relay Service (VRS) service, a Voice Carry Over (VCO) service, and a video call service after receiving the called party number.

8. The video phone of claim 7, wherein the interface comprises selectors for entering the called party number and for selecting one of VRS and Voice Carry Over (VCO) service request of the VRS system.

9. The video phone of claim 8, further comprising a remote control configured to operably couple with the interface and have entered therein the called party number and configured to have selected therein one service request.

10. A video relay service (VRS), comprising:
control logic configured to cooperatively establish a first segment of a communication session with a video phone and to receive unsolicited from the video phone over the first segment of the communication session a called party number, the control logic further configured to establish a service request into a service queue and cooperatively establish a second segment of the communication session with a voice phone as designated by the called party number, wherein the control logic is further configured to, upon selection of an associated selector, request one of a Video Relay Service (VRS) service, a Voice Carry Over (VCO) service, and a video call service after receiving the called party number; and
storage configured to store the called party number as received over the first segment of the communication session until the control process establishes the second segment of the communication session.

11. The video relay service (VRS) of claim 10, wherein the control logic is further configured to delay establishing the second segment until interpretive services of the VRS are available.

12. The video relay service (VRS) of claim 10, wherein the control logic is further configured to receive from the video phone over the first segment of the communication session one of a VRS and Voice Carry Over (VCO) service request identifying a specific level of interpretive services by the VRS.

13. A video relay service (VRS) system, comprising:
a video phone, comprising:
an interface configured to receive a called party number and to initiate a communication session;
storage configured to store the called party number and to have stored therein a network address of a Video Relay Service (VRS) system; and
control process configured to operably interact with the interface and the storage, the control process further configured to establish a first segment of the communication session between the video phone and the VRS system using the network address of the VRS system stored within the storage and forward the called party number to the VRS system over the first segment of the communication session, wherein the control process is further configured to, upon selection of an associated selector, request one of a Video Relay Service (VRS) service, a Voice Carry Over (VCO) service, and a video call service after the called party number is forwarded to the VRS system; and
a video relay service (VRS), comprising:
control logic configured to cooperatively establish a first segment of a communication session with a video phone and to receive unsolicited from the video phone over the first segment of a communication session a called party number, the control logic further configured to establish a service request into a service queue and cooperatively establish a second segment of the communication session with a voice phone as designated by the called party number; and
storage configured to store the called party number as received over the first segment of the communication session until the control process establishes the second segment of the communication session.

14. The video relay service (VRS) system of claim 13, wherein the control logic of the video relay service (VRS) is configured to delay establishing the second segment until interpretive services of the VRS system are available.

15. The video relay service (VRS) system of claim 13, wherein the control process of the video phone is further configured to establish the first segment of the communication session upon entering the called party number and selecting one of a VRS and Voice Carry Over (VCO) service request of the VRS at the video phone.

16. The video relay service (VRS) system of claim 15, wherein the interface includes a menu configured for entering the called party number and selecting one service request.

17. The video relay service (VRS) system of claim 15, further including a remote control configured for entering the called party number and selecting one service request.

18. The video relay service (VRS) system of claim 13, wherein the control process is configured to establish the first segment of the communication session and establish the second segment of the communication session according to a single selection at the video phone.

19. The video relay service (VRS) system of claim 13, wherein the storage of the video phone is further configured to retain the called party number of the voice phone until the first segment of the communication session is established and the called party number is sent to the VRS.

* * * * *